(12) United States Patent
Kim et al.

(10) Patent No.: US 6,937,393 B2
(45) Date of Patent: Aug. 30, 2005

(54) PROJECTION TELEVISION SCREEN

(75) Inventors: Deok-Joo Kim, Taejon (KR); Jeong-Su Yu, Taejon (KR); Young-Ki Park, Taejon (KR)

(73) Assignee: LG Chemical Ltd., Seoul (KR)

( * ) Notice: Subject to any disclaimer, the term of this patent is extended or adjusted under 35 U.S.C. 154(b) by 0 days.

(21) Appl. No.: 10/421,994

(22) Filed: Apr. 23, 2003

(65) Prior Publication Data

US 2004/0075899 A1 Apr. 22, 2004

Related U.S. Application Data

(63) Continuation-in-part of application No. 09/446,812, filed on Dec. 23, 1999, now abandoned, which is a continuation of application No. PCT/KR99/00043, filed on Jan. 23, 1999.

(30) Foreign Application Priority Data

Jan. 30, 1997 (KR) ........................................ 1997-29299

(51) Int. Cl.[7] .............................................. G03B 21/60
(52) U.S. Cl. ...................................................... 359/457
(58) Field of Search .............................. 359/455, 456, 359/457, 452, 453

(56) References Cited

U.S. PATENT DOCUMENTS

| | | | |
|---|---|---|---|
| 4,083,626 A | * | 4/1978 | Miyahara et al. ............. 359/457 |
| 5,457,572 A | * | 10/1995 | Ishii et al. .................. 359/457 |
| 5,513,036 A | * | 4/1996 | Watanabe et al. ........... 359/457 |
| 5,675,435 A | | 10/1997 | Ishii et al. |
| 5,724,182 A | * | 3/1998 | Mitani et al. ................ 359/457 |
| 5,745,288 A | * | 4/1998 | Miyata et al. ............... 359/457 |
| 5,815,313 A | | 9/1998 | Mitani et al. |
| 5,818,639 A | * | 10/1998 | Furuya ........................ 359/455 |
| 5,824,174 A | | 10/1998 | Mitani et al. |
| 5,903,399 A | * | 5/1999 | Yamashita et al. .......... 359/457 |
| 6,113,251 A | | 9/2000 | Miyata et al. |
| 6,275,334 B1 | | 8/2001 | Park |
| 6,307,675 B1 | * | 10/2001 | Abe et al. ................... 359/457 |

FOREIGN PATENT DOCUMENTS

| | | | | |
|---|---|---|---|---|
| JP | 63199338 A | * | 8/1988 | ........... G03B/21/62 |
| JP | 2157702 A | | 6/1990 | |
| JP | 3075702 A | | 3/1991 | |
| JP | 4329501 A | | 11/1992 | |
| JP | 5341385 A | | 12/1993 | |
| JP | 07028169 A | | 1/1995 | |
| JP | 07248537 A | | 9/1995 | |
| JP | 8-022077 | | 1/1996 | |
| JP | 08043949 A | | 2/1996 | |
| JP | 08137010 A | | 5/1996 | |

* cited by examiner

*Primary Examiner*—Christopher Mahoney
(74) *Attorney, Agent, or Firm*—Nixon Peabody LLP

(57) ABSTRACT

A television screen is provided with one or more substrates made of a thin film. A number of materials may be used for the film substrate. Further, structures are formed on one or more resin bearing surfaces of the film substrates using a number of techniques, including using patterned rollers to press against the resin bearing film surfaces. The resin can be liquid resin that is cured to set the patterned structures. The thin film results in stronger yet lightweight televisions screens that are safe and easy to handle.

8 Claims, 4 Drawing Sheets

PROJECTION TELEVISION SCREEN

This application is a continuation-in-part claiming benefit under 35 U.S.C. § 120 of U.S. patent application Ser. No. 09/446,812, filed Dec. 23, 1999 now abandoned, which is a continuation of PCT/KR99/00043 filed Jan. 23, 1999 hereby incorporated by reference in its entirety.

BACKGROUND OF INVENTION

1. Field of the Invention

The present invention relates to a projection television receiver and, more particularly, to a viewing screen for a projection television receiver.

2. Description of the Related Art

The viewing screen of a projection television receiver (hereinafter "projection television screen") is usually wider than the viewing screen of a conventional television receiver and thus weighs much more than the viewing screen of the conventional television receiver. A projection screen should be mechanically strong but not too heavy. Since a projection television screen is an exposed component of the television receiver, it is vulnerable to impact damage when the receiver is handled, used or moved.

A conventional projection television screen is made from an extruded polymethylmetacrylate(PMMA) sheet, which may be either a plain sheet or a sheet with shapes formed upon it to facilitate its various functions. PMMA sheets are heavy and have low mechanical strength and especially low impact strength. When a conventional projection screen is broken by an external impact, the pieces are very dangerous because they have many sharp edges.

SUMMARY OF THE INVENTION

An object of the present invention is to provide a projection television screen that it is safe, light, and mechanically strong.

Another object of the present invention is to provide a continuous-mode process for making a projection television screen that is safe, light, and mechanically strong.

In order to accomplish the above objects, the projection television screen of the present invention is made of a thin transparent film with high mechanical strength. Shapes may be formed on the surface of the film made of photo-curing resin in order to perform the necessary functions. After that, another type of film could be attached onto the shape formed on the substrate. The resultant structure according to the present invention is used as a projection television screen.

Yet another object of the present invention is to provide a manufacturing process for providing a screen which is described above. While in prior an a screen has been manufactured in a non-continuous way because only a planar shaped die is available in the prior art, with the manufacturing process of the present invention, a roll-shaped die can be easily fabricated using an electroforming method. Thus, continuous manufacture of a screen can be accomplished.

BRIEF DESCRIPTION OF DRAWINGS

These and other advantages and features of the present invention can be better understood with reference to the following description which will be described in conjunction with the accompanying drawings in which.

DESCRIPTION OF THE PREFERRED EMBODIMENTS

Figure 1:
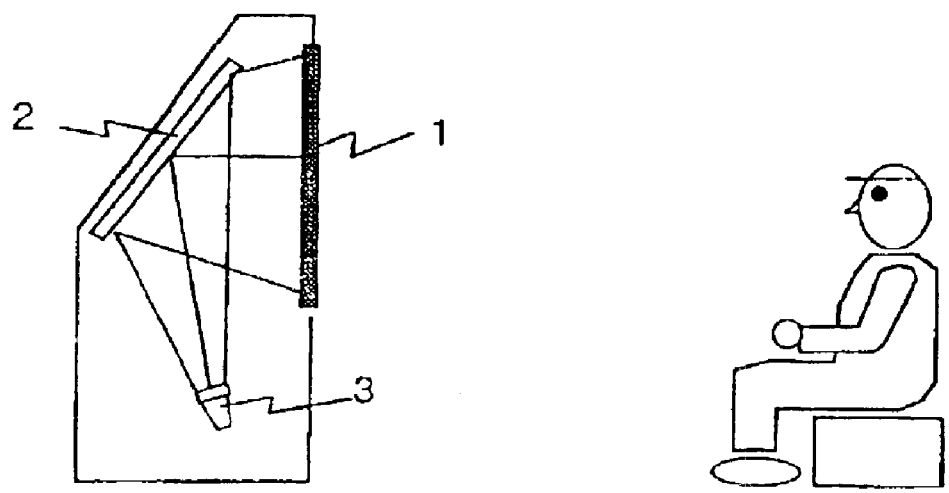
FIG. 1 illustrates the use of a projection television screen.
Figure 2:
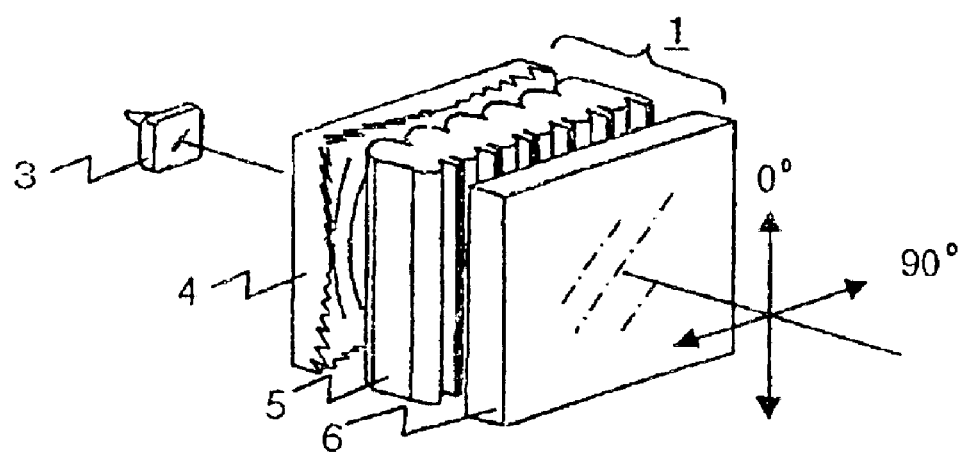
FIG. 2 illustrates the structure of a projection television screen according to an embodiment of the present invention.
Figure 3:
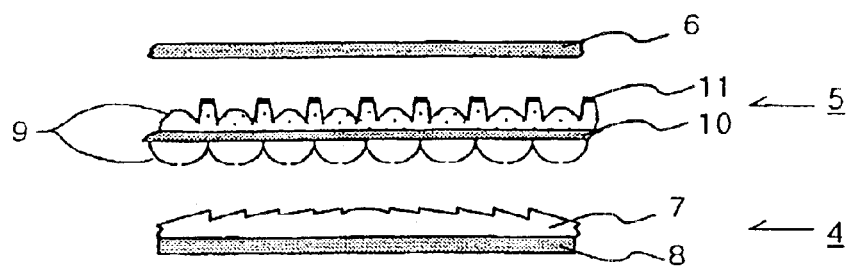
FIG. 3 illustrates the detailed structure of the projection television screen shown in FIG. 2.

As shown in FIGS. 2 and 3, a projection television screen 1 of the present invention comprises a Fresnel sheet 4; a lenticular sheet 5 adjacent to and optically aligned with the Fresnel sheet 4; and a transparent protective sheet 6 adjacent to the surface of the lenticular sheet 5 furthest from the Fresnel sheet 4.

The Fresnel sheet 4 comprises: a first transparent substrate 8; and a Fresnel lens 7 mounted on the surface of the first substrate 8 nearest the lenticular sheet 5. The Fresnel sheet 4 collimates light from an image protector 3 and uniformly projects the collimated light onto the surface of the lenticular sheet 5 nearest the Fresnel sheet 4. The Fresnel lens 7 is formed from a resin that is cured by exposure to ultraviolet light (hereinafter "ultra-violet resin") after the shape of the lens has been impressed upon the fluid resin.

The lenticular sheet 5 comprises: a second transparent substrate 10; a plurality of lenticular lenses 9 mounted on both surfaces of the second substrate 10; and light absorbing parts 11 mounted on the surface of the second substrate 10 furthest from the Fresnel sheet 4. The lenticular sheet 5 collects parallel red, green, and blue image beams from the Fresnel sheet 4 at a predetermined position of each of the pixels. The light absorbing parts 11 absorb stray ambient light and thus enhance the contrast of the images on the screen.

The ultra-violet resin used to make the Fresnel lens 7 may also be employed to make the lenticular lens 9. The type of film used for the substrate 8 of the Fresnel sheet 4 may also be employed for the substrate 10 of the lenticular sheet 5. A diffusion agent may be used, depending on the degree of light diffusion required, the ultra-violet resin used to make the Fresnel lens 7 or the lenticular lens 9. An ultra-violet curing black ink with extinction and adhesion characteristics is employed for the light absorbing parts 11.

The protective sheet 6 protects the Fresnel and lenticular sheets against damage from the outside. The material of the protective sheet 6 may be the same as that of the substrate 8 of the Fresnel sheet or the substrate 10 of the lenticular sheet 5. If desired, various coatings such as an anti-reflection coating and a scratch-resistant coating may be applied to the protective sheet 6. The protective sheet may also be colored.

The viscosity of the resin curable by ultra-violet light used to make the Fresnel lens 7 and the lenticular lens 9 ranges from 100 to 3000 cps at 25° C. The resin transmits more than 75% of the light incident on it. Preferably, the viscosity of the ultra-violet resin lies within the range 500 to 1500 cps at 25° C., and the transmissivity of the resin is more than 85%. Although the resin could be sufficiently spread on the surface of a shaping roller 12, when the viscosity is less than 100 cps, process control would not be easy and a significant amount of low-boiling point material would be lost. If the resin's viscosity were more than 3000 cps, spray coating process would be difficult and air bubbles could well be formed because the shaping roller 12 would not be sufficiently wet by the resin.

Materials which may be used for the ultra-violet resin of the Fresnel lens 7 and the lenticular lens 9 include: urethane acrylate resin, epoxy acrylate resin, ester acrylate resin, ether acrylate resin, and mixtures thereof.

The transparent substrate 8 of the Fresnel sheet 4, the transparent substrate 10 of the lenticular sheet 5, and the protective sheet 6 preferably have thickness of 10–250 $\mu$m, light transmissivity of 75% of more and a tensile strength of at least 600 kg/cm$^2$, and more preferably thickness of 50–150 $\mu$m, light transmissivity of 85% or more and a tensile strength of at least 1000 kg/cm$^2$. If the thickness were less than 10 $\mu$m or the tensile strength less than 600 kg/cm$^2$, the screen 1 could be easily be damaged and the film torn during the preparation of the screen. If the thickness were more than 250 $\mu$m, the total thickness and weight of the screen 1 would be too great arid the advantages of employing a film in the present invention would be lost. If the transmissivity were less than 75%, the transmissivity of the screen 1 would be too low.

Materials which may be used for the transparent film of the substrate 8 of the Fresnel sheet 4, the substrate 10 of the lenticular sheet 5 and the protective sheet 6 include: polyester, polyestersulfon, polyamide 6, polyamide 66, polycarbonate, polyestersulfon, polyester ketone, polyesterimide, polyacrylate, and mixtures thereof.

Figure 4:
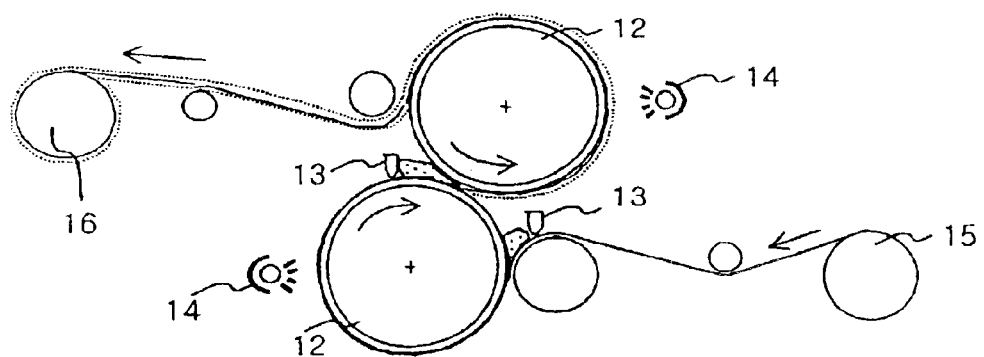
FIG. 4 illustrates a process of manufacturing a projection television screen according to an embodiment of the present invention.

FIG. 4 illustrates an apparatus for making shapes on one surface or both surfaces of the substrate of the Fresnel sheet 4 and the lenticular sheet 5 according to the present invention, the apparatus comprising a shaping roller 12; a device 13 for applying liquid resin to the substrate; an ultra-violet irradiating device 14; and a roller 15 for supplying the substrate film. The shaping roller 12 is easily replaceable in order to impress one surface or both surfaces of the substrate with various shapes.

Figure 5:
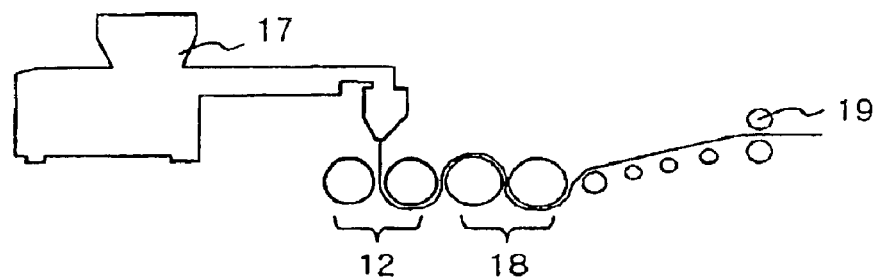
FIG. 5 illustrates a conventional process of manufacturing a lenticular sheet.

FIG. 5 illustrates a conventional apparatus used for manufacturing a lenticular sheet 5. In FIG. 5, a film extruded by an extruder 17 is shaped by a shaping roller 12 and thereafter cooled by a cooling roller 18 and drawn by a drawing roller 19. Such an apparatus cannot be used for manufacturing a thin-film lenticular sheet 5.

Figure 6:
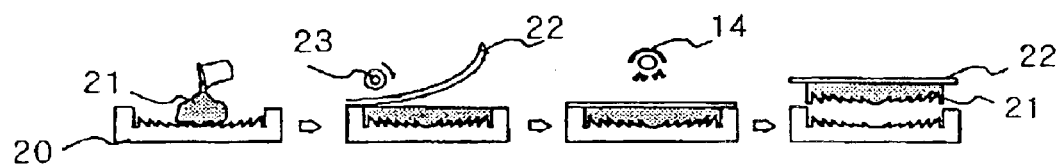
FIG. 6 illustrates a conventional process of manufacturing a Fresnel sheet.

FIG. 6 illustrates a conventional process of manufacturing a Fresnel sheet 4. In the process shown in FIG. 6, a liquid ultraviolet resin 21 is poured into a flat mold 20 to shape a Fresnel lens. The flat mold 20 is then covered with a panel 22 which forms the substrate of the Fresnel lens. The resin 21 is passed through a roller 23 and is exposed to an ultra-violet irradiating device 14. The conventional method of FIG. 6 is not applicable to mass production and the process can be operated only in a batch mode. A thin-film substrate could not easily be used in the method illustrated by FIG. 6.

Figure 7:
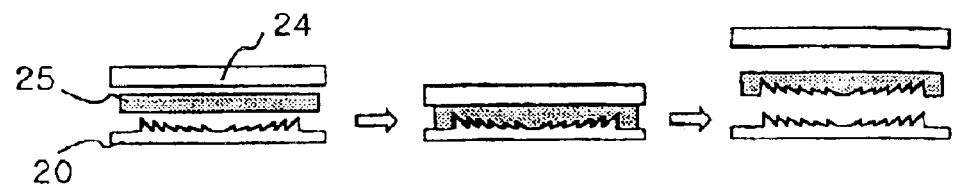
FIG. 7 illustrates a second conventional process of manufacturing a Fresnel sheet.

FIG. 7 illustrates a conventional process of manufacturing a Fresnel lens using a press. In the process shown in FIG. 7, a Fresnel substrate 25 is inserted between the flat mold 20 and a planer upper die 24. The Fresnel substrate 25 is then heated, pressed, rolled and released. However, this press process has the disadvantages of long manufacturing time, and short duration of the die, and consequent low productivity.

Figure 8:
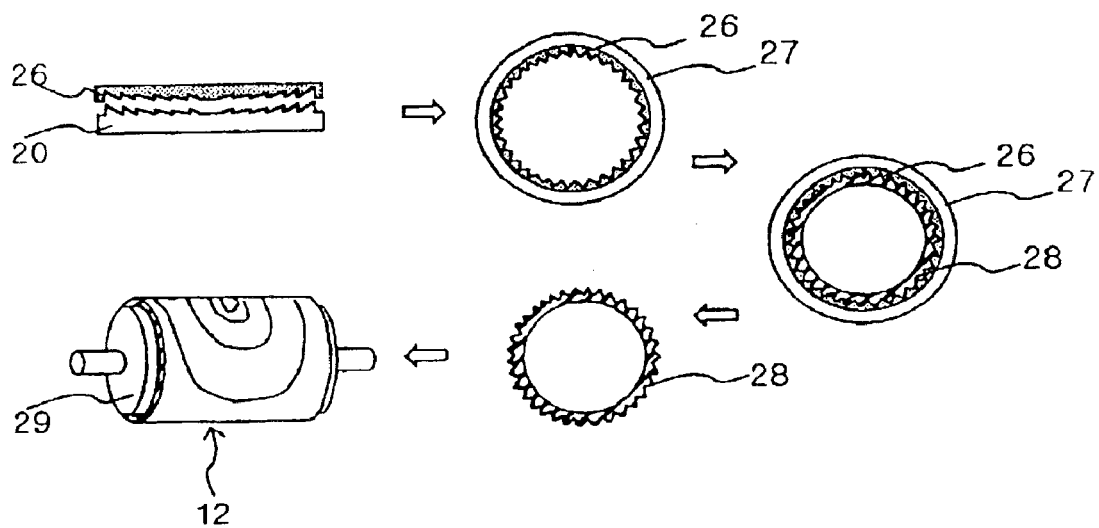
FIG. 8 illustrates a process of fabricating an electroforming roll suitable for manufacturing the Fresnel sheet and the lenticular sheet of the present invention.

FIG. 8 illustrates a process of manufacturing a shaping roller for forming a Fresnel sheet 4 and a lenticular sheet 5 according to an embodiment of the present invention. According to the present invention, the Fresnel sheet 4 and the lenticular sheet 5 can be manufactured in continuous mode due to the use of a roll shaped die rather than the planar die of the prior art.

The electroforming method illustrated in FIG. 8 may be used for manufacturing a shaping roller. In FIG. 8, a silicone rubber die mold 26 is patterned using a planar die 20. The patterned silicone rubber die mold 26 is made into a tube-type die by a reinforcing steel tube 27. After a metal electroforming die 28, made, for example, of nickel chromium has been fabricated at the inner side of the tube-type silicone rubber die mold 26 by means of an electroforming method, the reinforcing steel tube 27 is removed, which leaves only the electroformed metal die 28. Finally, the shaping roller is completed by inserting and fixing a cylindrical steel tube roller with a shaft into the electroformed metal die 28.

The invention described above will be more fully understood with reference to the following Example and Comparative Example.

EXAMPLE

Urethane acrylate resin is used as the ultra-violet resin of the Fresnel lens 7 and the lenticular lens 9. Polyester film is used for the substrate 8 of the Fresnel sheet 4, the substrate 10 of the lenticular sheet and the protective sheet 6. The properties of urethane acrylate resin and polyester film used in the present example are summarized in tables 1 and 2, respectively.

The process conditions are as follows:
surface temperature: 35±5° C.; and
manufacturing speed: 4 to 7 m/min.

COMPARATIVE EXAMPLE

A comparative product is manufactured as a prior art product. Polymethylmetacrylate is used for the substrate 8 of the Fresnel sheet 4 and the lenticular sheet 5. Urethane acrylate is used for the Fresnel lens 7.

TABLE 1

Properties of Urethane Acrylate Resin used in Fresnel lens and lenticular lens

| Item | Properties | Remarks |
| --- | --- | --- |
| Composition | Urethaneacrylate | Sunkyung-UCB Co., Ltd. |
| Viscosity (cps) | 950 ± 50 | 25° C. |
| Transmission rate of total amount of light (%) | 91 ± 1 | |
| Index of Reflection | 1.52 ± 0.02 | |
| Specific Gravity | 1.1 | |

TABLE 2

Properties of Polyester Film [used in Protective Sheet]

| Item | Properties | Remarks |
| --- | --- | --- |
| Composition | Polyester | SKC Co., Ltd. |
| Thickness ($\mu$m) | 200 | protective sheet |
|  | 100 | Fresnel sheet |
|  | 50 | lenticular sheet |
| Index of Reflection | 1.64 ± 0.01 | |
| Transmission rate of Total amount of Light (%) | 91 | |
| Specific Gravity | 1.4 | |
| Tensile Strength (Kg/cm$^2$) | 2,500 ± 50 | |

TABLE 3

Properties of the Screens.

| | Item | Example 1 | Comparative Example 1 | |
|---|---|---|---|---|
| Weight (gr) | Protective sheet (6) | 160 | 1260 | |
| | Fresnel sheet (4) | 140 | 504 | |
| | lenticular sheet (5) | 191 | 1250 | |
| | total | 491 | 3014 | |
| Thickness of Screen (mm) | | 0.85 | 5.00 | |
| Tensile Strength (Kg/cm²) | Protective sheet (6) | 2500/2500 | 550/550 | *Polyester film |
| | Fresnel sheet (4) | 2200/2200 | 480/480 | |
| | lenticular sheet (5) | 2100/2050 | 500/120 | 0° direction (90° direction) |
| Transmission rate of total amount of light (%) | | 89 | 85 | |
| Particulars | | | Screen (1) diagonal length: 43 inch Aspect ratio = 4:3 | |

As can be seen from Table 3, the projection tv screen 1 according to an embodiment of the present invention weights of 84% less and has tensile strength 4.5 times greater than conventional television screen.

What is claimed is:

1. A projection television screen comprising:

Fresnel sheet comprising a first transparent substrate with a Fresnel lens formed on the first transparent substrate;

a lenticular sheet comprising a second transparent substrate having a first surface and a second surface, a first lenticular lens formed on the first surface facing the Fresnel lens, and a second lenticular lens formed on the second surface, wherein at least one of the first lenticular lens and the second lenticular lens is separate from, but mounted on the second transparent substrate; and a protective sheet comprising a third transparent substrate facing the second lenticular lens formed on the second surface of the lenticular sheet wherein the first transparent substrate, the second transparent substrate and the third transparent substrate comprise a synthetic resin film comprising a transmission rate of a total amount of light of at least about 75%, and a tensile strength of at least about 600 Kg/cm².

2. The projection television screen according to claim 1, wherein the synthetic resin film comprises at least one of polyester, polyvinylchloride, polyamide 6, polyamide 66, polycarbonate, polyestersulfon, polyester ketone, polyesterimide, and polyacrylate.

3. The projection television screen according to claim 1, wherein at least one of the first and second lenticular lenses and the Fresnel lens comprise a resin cured by ultra-violet light.

4. The projection television screen according to claim 3, wherein a pattern of the Fresnel lens is formed by pressing a die mold pattern on the resin.

5. The projection television screen according to claim 3, wherein the resin further comprises a liquid resin having a viscosity ranging from about 100 cps to about 3000 cps at about 25° C., and a transmission rate of a total amount of light is at least about 75%.

6. The projection television screen according to claim 3, wherein the resin is formed from at least one of urethane acrylate; epoxy acrylate, ester acrylate, and ether acrylate resins.

7. The projection television screen according to claim 3, wherein the resin further comprises a diffusing agent.

8. The projection television screen according to claim 3, wherein the second lenticular lens comprises a plurality of light absorbing parts.

* * * * *